United States Patent
Toyoda et al.

[11] Patent Number: 5,316,997
[45] Date of Patent: May 31, 1994

[54] HEAT RESISTING STRUCTURE

[75] Inventors: Tetsuro Toyoda; Katsunori Matsuoka, both of Tokyo, Japan

[73] Assignee: Showa Aircraft Industry Co., Ltd., Tokyo, Japan

[21] Appl. No.: 667,383

[22] PCT Filed: Jul. 30, 1990

[86] PCT No.: PCT/JP90/00969

§ 371 Date: Mar. 26, 1991

§ 102(e) Date: Mar. 26, 1991

[87] PCT Pub. No.: WO91/01876

PCT Pub. Date: Feb. 21, 1991

[30] Foreign Application Priority Data

Aug. 4, 1989 [JP] Japan .................... 1-202317
Aug. 29, 1989 [JP] Japan .................... 1-224273
Mar. 22, 1990 [JP] Japan .................... 2-72638

[51] Int. Cl.5 ............................... B32B 3/12
[52] U.S. Cl. .................... 502/314; 428/116; 428/188; 428/593; 502/527
[58] Field of Search .......... 428/116, 593, 188; 502/527, 314

[56] References Cited

U.S. PATENT DOCUMENTS

| 4,410,604 | 10/1983 | Pohlman et al. .............. 428/681 |
| 4,444,587 | 4/1984 | Kelly ........................ 420/44 |
| 4,948,774 | 8/1990 | Usui et al. ................ 428/593 X |
| 5,002,923 | 3/1991 | Koshiba et al. ............ 428/593 X |
| 5,026,611 | 6/1991 | Usui et al. ................ 428/593 |
| 5,084,361 | 1/1992 | Toyoda et al. .............. 428/593 |

FOREIGN PATENT DOCUMENTS

| 63-299875 | 12/1988 | Japan . |
| 64-48666 | 2/1989 | Japan . |
| 64-48667 | 2/1989 | Japan . |
| 64-48671 | 2/1989 | Japan . |
| 64-48696 | 2/1989 | Japan . |

Primary Examiner—Henry F. Epstein
Attorney, Agent, or Firm—Lowe, Price, LeBlanc & Becker

[57] ABSTRACT

An improved heat resisting structure for treating the exhaust gas of a gas engine is disclosed. The heat resisting structure has a honeycomb-form structure formed of corrugated and flat sheets which are alternately overlapped, rolled up, and joined via a brazing filler metal to make a roll-form structure. The brazing filler metal is made of iron(Fe)-base brazing filler metal, and the stainless steel corrugated sheet and flat sheet constituting the base metal are similar in composition. Accordingly, almost no difference exists in the coefficient of thermal expansion between the brazing filler metal and the base metal. As a result, cracks caused by thermal stress between them due to a difference in coefficient of thermal expansion is avoided even when used repeatedly.

5 Claims, 6 Drawing Sheets

F I G. 4
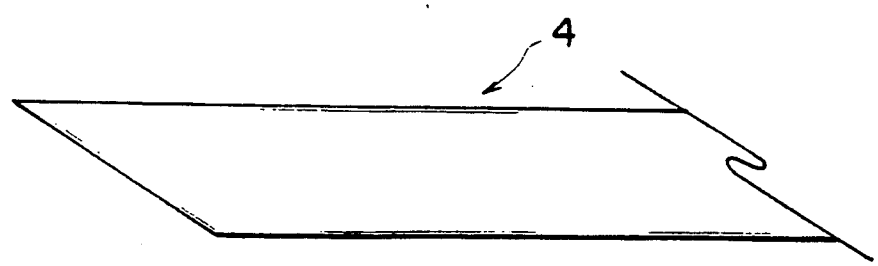
F I G. 5
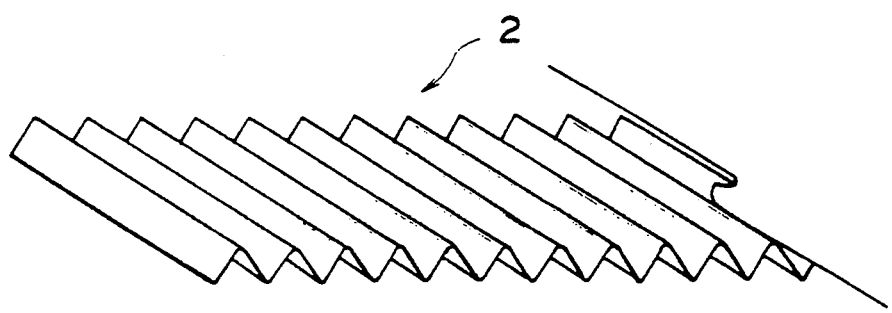
F I G. 6
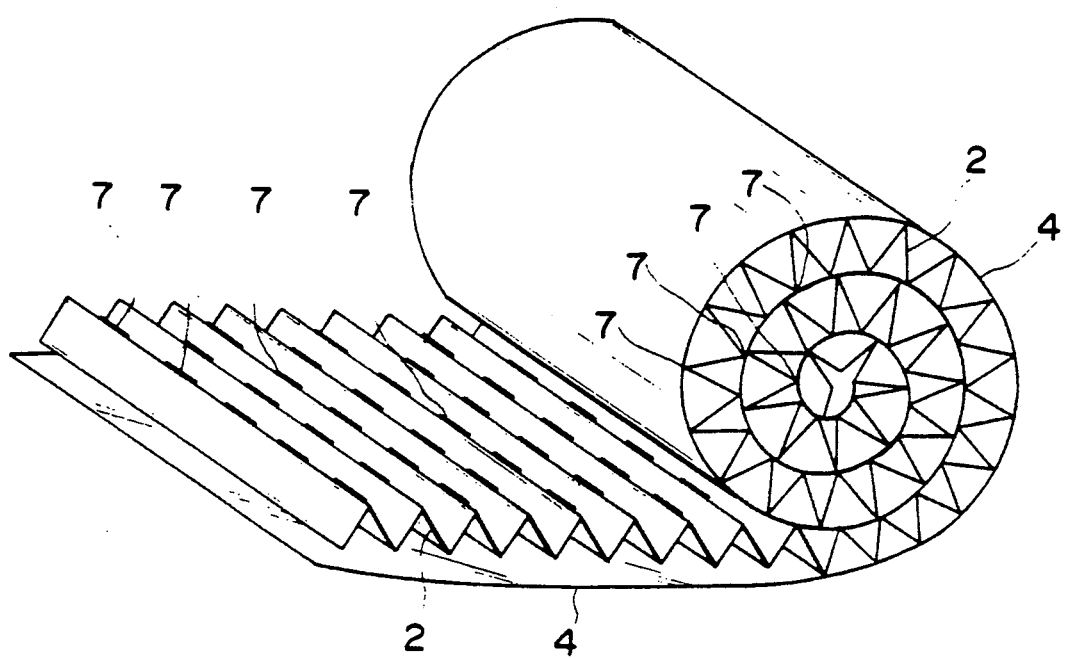

HEAT RESISTING STRUCTURE

FIELD OF INVENTION

The present invention relates to a heat resisting structure to be used at a high environmental temperature. More particularly, the present invention relates to a heat resisting structure wherein stainless steel corrugated sheets, flat sheets, etc. are joined together with brazing filler metal to form a honeycomb-form structure and it is used, for example, for a catalytic converter to treat exhaust gas of an automobile engine or the like as a catalyst holding body to which catalyst is made adhered.

BACKGROUND OF THE INVENTION

A heat resisting structure wherein stainless steel corrugated sheets having alternating ridges and grooves formed by folding the sheet continuously and flat stainless steel sheets, etc. are joined together with nickel(Ni)-base brazing filler metal to form honeycomb-form structure is conventionally used. In such a conventional heat resisting structure, stainless steel corrugated sheets, flat sheets, etc. which are highly resistant to corrosion and heat are used as base metal and nickel(Ni)-base brazing filler metal which is also highly resistant to corrosion and heat is used to withstand a high environmental temperature. The heat resisting structure is formed into a roll-form by rolling up the corrugated sheet, flat sheet, etc. and joining together with nickel(Ni)-base brazing filler metal or formed into a laminated block by stacking the materials into many layers and joining together, and thus formed honeycomb-form structure is utilized as a catalyst holding body and for other various uses.

Now, in relation to the corrugated sheet, flat sheet, brazing filler metal, etc. of the heat resisting structure, the prior art will be examined in detail. First, as to the corrugated sheet, flat sheet, etc. constituting the base metal, those of austenitic stainless steel are used. Recently, those of ferritic stainless steel also are in use. As to the brazing filler metal, nickel(Ni)-base brazing filler metal is used generally by applying it to the entire surface. The brazing filler metal is provided over the entire surface between the corrugated sheet, flat sheet, etc. constituting the base metal by, for example, coating the entire surface, placing foil-like brazing filler metal between the sheets over the entire surface, or using a brazing sheet coated with brazing filler metal over the entire surfaces. Composition of brazing filler metal currently in use is, by weight, 0.1% C maximum, 7.0 to 8.0% silicon Si, 18.0% to 9.0% chromium Cr, 1.0 to 1.5% boron B, and the remainder is nickel Ni.

However, the following problems have been pointed out concerning the above-mentioned conventional heat resisting structure.

First, the heat resisting structure employing austenitic stainless steel corrugated sheets, flat sheets, etc. is excellent in oxidation resistance as well as high-temperature strength to withstand a high environmental temperature during the use. However, this heat resisting structure, when stress is applied during use at a high environmental temperature, sometimes form stress corrosion cracks in the corrugated sheets, flat sheets, etc. constituting the base metal, in some cases carbide is precipitated on grain boundaries of the austenitic portion of the base metal, where intergranular corrosion cracking occurs, and thus durability of the structure at a high environmental temperature is affected. In addition, there is a problem in cost due to the expensiveness of the material. To solve the problems in the heat resisting structure of austenitic stainless steel mentioned above, heat resisting structure wherein ferritic stainless steel corrugated sheets, flat sheets, etc. are used as the base metal has been developed.

Secondly, in the heat resisting structure employing stainless steel, particularly ferritic stainless steel corrugated sheets, flat sheets, etc., the state of elements of the alloy, so-called phase, of the corrugated sheets, flat sheets, etc. which are the base metal is different from that of nickel(Ni)-base brazing filler metal. Therefore, when nickel(Ni)-base brazing filler metal diffuses into the base metal owing to brazing for joining, the phase tends to change in the vicinity of the boundary where the base metal is joined, causing phase transition. (For example, transition to gamma phase. Hereinafter, the same applies.) Therefore, use at a high environmental temperature is sometimes affected adversely. More specifically, when such conventional heat resisting structure is used at a high environmental temperature, chromium Cr contained in nickel(Ni)-base brazing filler metal is segregated in the vicinity of the boundary where the base metal of, for example, ferritic stainless steel is joined by brazing, making the chromium Cr concentration very high at the portion of the metal phase, and the portion of low chromium Cr concentration is prone to oxidation. Further, when the conventional heat resisting structure is used at a high environmental temperature, carbon C contained in the nickel(Ni)-base brazing filler metal is sometimes precipitated as carbide on the grain boundaries in the vicinity of the boundary where the base metal is joined by brazing. The precipitated material reduces the strength lower than the toughness. Therefore, stress corrosion cracking, intergranular corrosion cracking, intergranular separation, etc tend to occur in the austenitized portion in a similar manner to that mentioned above. (For example, transition to gamma phase. Hereinafter, the same applies.)

Thirdly, because the phase of the stainless steel, for example, ferritic stainless steel corrugated sheets, flat sheets, etc. is different from the phase of nickel(Ni)-base brazing filler metal, there is a difference in the coefficient of thermal expansion between the two. Consequently, repeated use of the heat resisting structure sometimes generates stress cracks between them. Particularly, since there is a great difference in the coefficient of thermal expansion between the austenitized portion and the base metal, cracks tend to occur there as mentioned above.

Fourthly, due to above-mentioned reasons, the problem that a conventional heat resisting structure is poor in oxidation resistance and durability when used at a high environmental temperature has been pointed out. Furthermore, in such a heat resisting structure, brazing filler metal which causes the above-mentioned problem is arranged in large quantities over the entire surface between the corrugated sheets and flat sheets constituting the base metal, therefore oxidation rate is large, oxidation resistance is poor, and durability is also poor.

Fifthly, when such conventional heat resisting structure is used, for example, for a catalytic converter to treat exhaust gas of an automobile engine as a catalyst holding body to which catalyst is made adhered, a problem has been pointed out in treatment efficiency of the catalyst. In detail, since brazing filler metal made of nickel(Ni)-base brazing filler metal is used in quantities over the entire surface as described previously, adhesion of alumina wash-coat to be applied as primer between the corrugated sheets, flat sheets, etc. constituting the base metal and the catalyst to the base metal is poor, and as a result, adhesion of the catalyst to the base metal is sometimes impaired. Even if the catalyst adheres normally, the catalyst dissolves into the brazing filler metal as a solid solution, thereby lowering the catalyst density at the surface of the base metal. As described above, when the conventional heat resisting structure is used as a catalyst holding body, the catalyst is difficult to adhere and tends to dissolve into the brazing filler metal as solid solution, therefore, treatment efficiency of the catalyst becomes low and exhaust gas treatment efficiency becomes poor.

Such problems have been pointed out concerning the conventional heat resisting structure.

DISCLOSURE OF THE INVENTION

The present invention has been originally conceived in consideration of actual condition of prior art. The present invention relates to heat resisting structure of honeycomb-form construction wherein corrugated sheets having alternating ridges and grooves formed by folding the sheet continuously and flat sheets, etc. are joined together with brazing filler metal. This heat resisting structure, for example, is made in a roll-form wherein a belt-form corrugated sheet and flat sheet are alternately overlapped, rolled up, and jointed. Also, this heat resisting structure, for example, is made in a laminated block-form wherein corrugated sheets of predetermined length and flat sheets are alternately and sequentially overlapped in many layers and joined. Further, this heat resisting structure, for example, is made in a roll-form using a belt-form corrugated sheet only or made in the laminated block form using corrugated sheets only as the case may be.

The first mode of this invention is a heat resisting structure, wherein the heat resisting structure is made into a roll-form using a corrugated sheet and flat sheet or corrugated sheet only, and the corrugated sheet and flat sheet are of stainless steel and the brazing filler metal of nickel(Ni)-base brazing filler metal containing silicon Si and boron B is used as the brazing filler metal.

The second mode of this invention is a heat resisting structure of a roll-form using a corrugated sheet and flat sheet, wherein the corrugated sheet and flat sheet are of ferritic stainless steel, and nickel(Ni)-base brazing filler metal is used as the brazing filler metal, which is arranged at predetermined places in the joint area of the corrugated sheet and flat sheet, and the quantity of the brazing filler metal has been determined to be a rate within a range from 0.002 g to 0.07 g per 1 cc volume of the heat resisting structure. The manufacturing method of the heat resisting structure comprises a preparation process, brazing filler metal arranging process, forming process, joining process, etc. In the preparation process, a ferritic stainless steel corrugated sheet and a ferritic stainless steel flat sheet are prepared. In the brazing filler metal arranging process, nickel(Ni)-base brazing filler metal is used with the quantity determined to be a rate within a range from 0.002 g to 0.07 g per 1 cc volume of the heat resisting structure. The brazing filler metal is arranged at predetermined places in the joint area between the corrugated sheet and flat sheet. In the forming process which is performed before, after, or concurrently with the brazing filler metal arranging process, the corrugated sheet and flat sheet are alternately rolled up so as to make a roll-form. In the joining process, the corrugated sheet and flat sheet are joined together with brazing filler metal by heating up after above-mentioned processes.

The third mode of this invention is a heat resisting structure of a roll or laminated block form, wherein the corrugated sheet and flat sheet are of stainless steel and the brazing filler metal is of iron(Fe)-base brazing filler metal.

Now, the inventions having these three modes consist of a group of interrelated inventions which form a single invention concept and exhibit the following operational effects common to these modes.

First, when this heat resisting structure is used at a high environmental temperature, occurrence of segregation at the vicinity of the joint boundary of the corrugated sheet, flat sheet, etc. constituting the base metal joined with brazing filler metal is reduced and consequently generation of a high chromium Cr concentration portion is reduced, as a result, occurrence of the problem that a low chromium Cr concentration portion is prone to oxidation is prevented. In addition, in this heat resisting structure, the effect of carbide precipitated in the vicinity of the joint boundary on the grain boundaries is reduced, thereby stress corrosion cracking, intergranular corrosion cracking, intergranular separation, etc. are reduced.

Secondly, since adverse effect of austenitization in the vicinity of the joint boundary is reduced, cracking in the vicinity of the joint boundary is avoided. Accordingly, in spite of the difference in the composition between the corrugated, flat sheets, etc. and the brazing filler metal, and difference in the coefficient of thermal expansion between them, occurrence of cracks in the vicinity of the joint boundary is almost avoided.

Thirdly, considering the points mentioned above, this heat resisting structure has a low oxidation rate and has improved oxidation resistance and excellent durability.

Fourthly, this heat resisting structure is advantageous in the aspect of cost, because it can be manufactured with ease with fewer man-hours. For example, arranging the brazing filler metal and its setting are easy.

BRIEF DESCRIPTION OF THE DRAWINGS

FIGS. 1 and 2 show preferred embodiments of the first mode of the heat resisting structure in accordance with the present invention, in which FIG. 1 is a perspective view of the roll-form structure and FIG. 2 is a perspective view of the laminated block-form structure.

FIGS. 4 through 8 show preferred embodiments of the second mode of the heat resisting structure in accordance with the present invention, in which FIG. 4 is a perspective view of the flat sheet for explaining the preparation process of the manufacturing method, FIG. 5 is a perspective view of the corrugated sheet, FIG. 6 is a perspective view for explaining the brazing filler metal arranging process and forming process of the manufacturing method, FIG. 7 is a perspective view of a case, and FIG. 8 is a perspective view of the roll-form heat resisting structure thus manufactured.

FIGS. 11 and 12 show preferred embodiments of the third mode of the heat resisting structure in accordance with the present invention, in which FIG. 11 is a perspective view of the roll-form structure and FIG. 12 is a perspective view of the laminated block-form structure.

DESCRIPTION OF THE PREFERRED EMBODIMENTS

Embodiments of this invention will be described in detail with reference to attached drawings.

Figure 1:
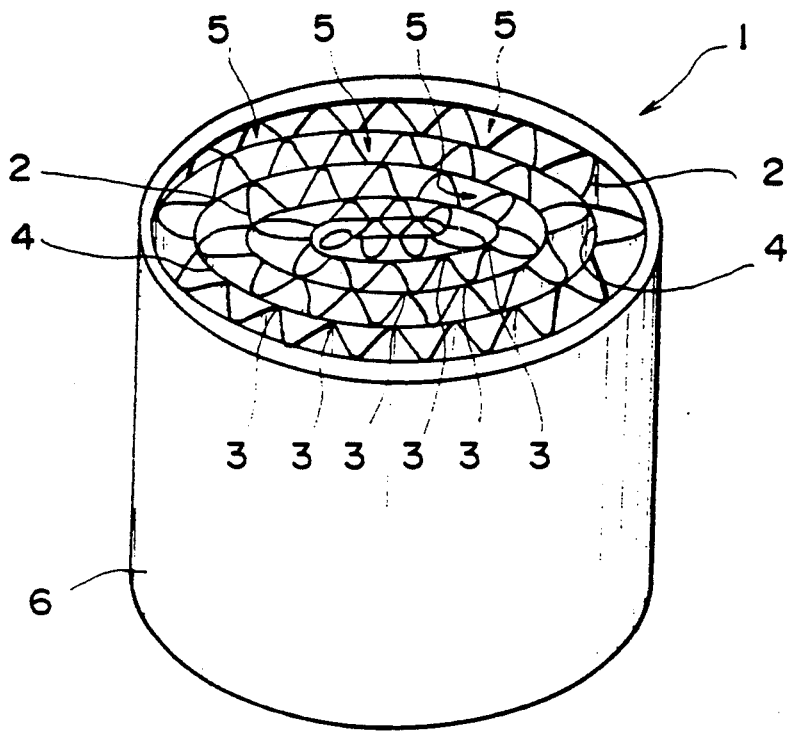
Figure 2:
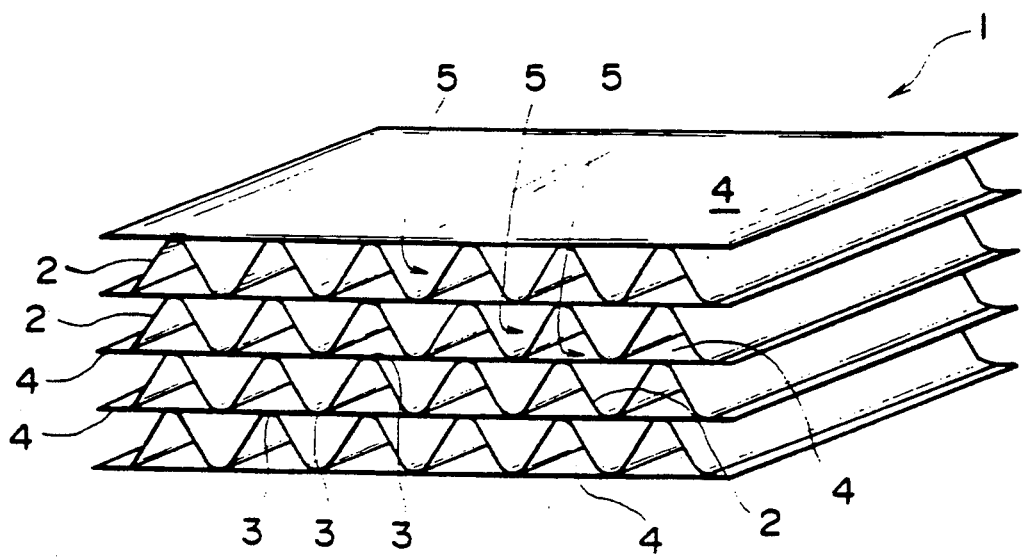
Figure 3:
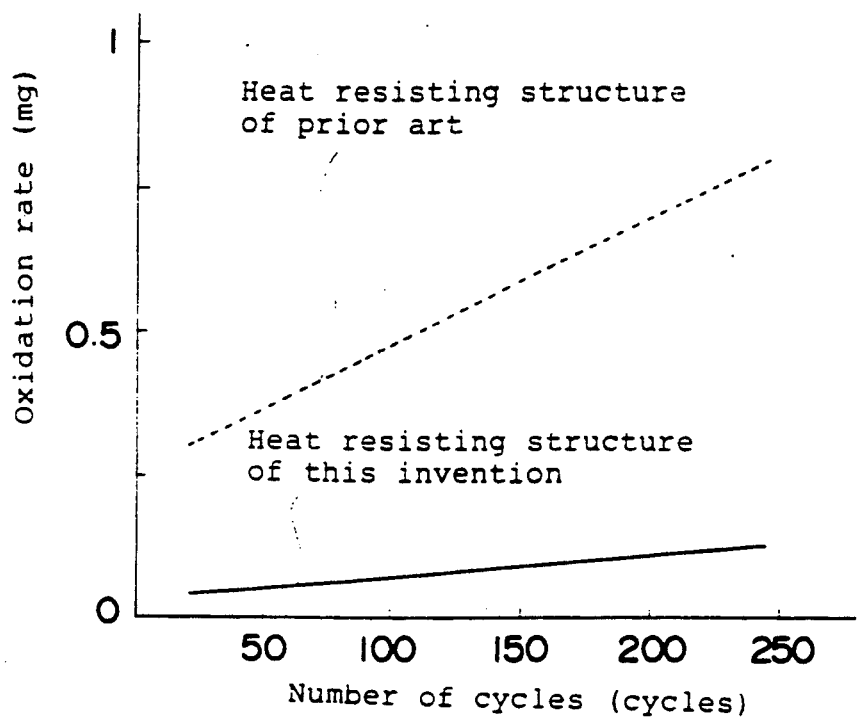
FIG. 3 is a graph showing the comparison of the oxidation rate between the heat resisting structure of the present invention and conventional heat resisting structure.

Referring first to FIGS. 1, 2 and 3, the heat resisting structure 1 shown in these drawings is of a honeycomb-like structure wherein a belt-form stainless steel corrugated sheet 2, etc. having alternating ridges and grooves formed by folding the sheet continuously is joined alternately via brazing filler metal 3.

First, referring to FIG. 1, as a base metal of the heat resisting structure 1, one belt-form corrugated sheet 2 having alternating ridges and grooves formed by folding the sheet continuously and made of stainless steel foil, and one belt-form flat sheet 4 of stainless steel foil are used. In FIG. 1, one long sheet of such corrugated sheet 2 and one long sheet of flat sheet 4 are used. The corrugated sheet 2 is formed into a large number of straight ridges and grooves of predetermined pitch and height continuously and in parallel by folding the sheet by a corrugating machine, press, etc. The base metal of the heat resisting structure 1 may be such that more than one corrugated sheets 5 and flat sheets 4 may be used disregarding the example of FIG. 1. Further, use of one or more corrugated sheets, without using the flat sheet 4, may be feasible.

In the embodiment shown in FIG. 1, the shape of the heat resisting structure 1 is a roll-form of a circular cylinder, elliptical cylinder, etc. wherein one corrugated sheet 2 and one flat sheet 4 are alternately lapped, rolled up, and joined starting at the center via the brazing filler metal 3. The shape of the heat resisting structure may be such, different from the embodiment shown in FIG. 1, that more than one plate-form corrugated sheets 2 of a predetermined length, flat sheets 4, etc. constituting the base metal are alternately and sequentially stacked in many layers and joined via brazing filler metal 3 to make a laminated block-form as shown in FIG. 2.

And the heat resisting structure 1 is a honeycomb-form construction. That is, the base metal, i.e., in the examples of FIGS. 1 and 2, the corrugated sheets 2 and flat sheets 4 form cell walls and a honeycomb-form structure which is a plane assembly of many hollow column-like cells 5 of a variety of shapes including a triangle, semihexagon, trapezoid, or the like. Accordingly, this heat resisting structure 1 has an excellent specific strength, light weight, and high rigidity and strength. It is also known to have a good flow straightening effect, easy-to-form feature, and low cost. Further, the surface area per unit volume is large, in other words, the surface area of cell walls formed by the corrugated sheets 2, flat sheets 4, etc., is large, and in addition the high temperature strength is large since the corrugated sheets 2 and flat sheets 4 are made of stainless steel which is highly resistant to heat and the brazing filler metal 3 is made of nickel (Ni)-base brazing filler metal which is also highly resistant to heat. Due to such advantages, this heat resisting structure 1 is, for example, used for a catalytic converter to treat exhaust gas of an automobile engine, etc., as a catalyst holding body and catalyst is made adhered to the surface of the corrugated sheets 2 and flat sheets 4 which form the cell walls.

In such a heat resisting structure 1, nickel(Ni)-base brazing filler metal containing silicon Si and boron B is used as the brazing filler metal 3 for joining. More specifically, nickel(Ni)-base brazing filler metal composed mainly, by weight, of 4.0 to 8.0% silicon Si, 2.0 to 4.5% boron B, and the remainder nickel Ni is used as the brazing filler metal 3. Carbon C and chromium Cr are not almost contained in the main components. Such brazing filler metal 3 is provided at places in the joint area between the corrugated sheets 2 and flat sheets 4 which constitute the base metal, and melts when heated and brazes the joint area when hardens. In FIG. 1, reference number 6 designates a case which is an outer cylinder for holding an inserted roll-form heat resisting structure 1.

The heat resisting structures 1 shown in FIGS. 1 and 2 are constructed in the above-mentioned manner and used, for example, as a catalyst holding body of a catalytic converter of an automobile engine or the like. Exhaust gas of an automobile engine or the like which contains harmful substances and of a high temperature is treated by reaction of the catalyst made adhered to the corrugated sheet 2, flat sheet 4, etc. which form the cell walls while it is passing through each cell 5 of honeycomb-form structure of the heat resisting structure 1.

This heat resisting structure 1 uses nickel(Ni)-base brazing filler metal containing silicon Si and boron B as the brazing filler metal for joining stainless steel corrugated sheets 2 and flat sheets 4. Therefore, advantages described in (1), (2), (3) and (4) below are obtained.

(1) The brazing filler metal 3 contains almost no chromium Cr. Accordingly, even when this heat resisting structure 1 is used at a high environmental temperature, segregation (chromium Cr concentration becomes very high partially) in the vicinity of the brazing joint boundary of the stainless steel corrugated sheets 2, flat sheets 4, etc. constituting the base metal does not occur, thereby eliminating the possibility that the low chromium portion becomes prone to oxidation, and oxidation rate of this heat resisting structure 1 is small. FIG. 3 is a graph showing the comparison of oxidation rate between a heat resisting structure of prior art and the heat resisting structure 1 of the present invention. More specifically, FIG. 3 shows a cycle test result wherein one cycle was 30-min period, the heat resisting structure was heated to a high temperature of 1,000° C., and then the structure was air-cooled for 10 minutes, again one cycle of high temperature heating was performed, thereafter this procedure was repeated many times, and each time increase of oxide was measured under such test conditions. As shown in FIG. 3, the heat resisting structure 1 of the present invention which uses the brazing filler metal 3 containing no chromium Cr is far lower in the oxidation rate in comparison with a heat resisting structure of prior art which uses the brazing filler metal containing chromium Cr. This fact does not change even when the number of cycles is increased.

This brazing filler metal 3 contains almost no carbon C. Accordingly, when the heat resisting structure 1 is used at a high environmental temperature, adverse effect due to precipitation of carbide on the grain boundary in the vicinity of brazing joint boundary of the stainless steel corrugated sheets 2, flat sheets 4, etc. constituting the base metal, does not exist. Since no carbide is precipitated, there is no possibility of formation of precipitation phase of hard portion and other soft portion, and accordingly occurrence of stress corrosion cracking, intergranular corrosion cracking, intergranular separation, etc. at this portion are prevented.

(2) The heat resisting structure 1 of the present invention has a small oxidation rate, high in oxidation resistance, and excellent in durability.

(3) These advantages are realized without reducing the quantity of the brazing filler metal 3. In other words, the heat resisting structure 1 of the present invention is not designed to promote oxidation resistance and durability by reducing the quantity of the brazing filler metal 3 to be used. Arranging the brazing filler metal 3 is simple and easy because positioning of the brazing filler metal 3 in the corrugated sheets 2, flat sheets 4, etc. constituting the base metal for forming the heat resisting structure 1 of the present invention requires no exact control, and consequently required production man-hours are relatively small.

(4) The heat resisting structure 1 of the present invention is excellent in strength since the brazing joint portion is sufficiently secured as a whole. Particularly, when the flat sheets 4 are not used but the corrugated sheets 2 alone are used as the base metal of the heat resisting structure 1 without following the embodiments shown in FIGS. 1 and 2, the advantage in terms of strength is significant. That is, in the case of such construction, the brazing joint area is small and therefore the strength is uncertain; if the brazing joint area is reduced by reducing the quantity of the brazing filler metal to be used despite this fact, the strength decreases remarkably. On the contrary, however, in the heat resisting structure 1 of the present invention, the brazing joint area is sufficiently secured even in such construction, thereby an advantage in the aspect of strength is maintained.

In referring to FIGS. 1, 2 and 3, the above explanation was made.

Now, explanation will be made with reference to FIGS. 4 through 10.

First, the manufacturing method of the heat resisting structure 1 shown in these drawings will be described in the sequence of the preparation process, brazing filler metal arranging process, forming process, and joining process, and then the heat resisting structure 1 will be described.

The preparation process is as follows.

In the preparation process (the first process), a ferritic stainless steel corrugated sheet 2 (see FIG. 5) having alternating ridges and grooves formed by folding the sheet continuously into a belt-form and a ferritic stainless steel flat sheet 4 (see FIG. 4) of a belt-form are prepared. As raw materials of the corrugated sheet 2 and flat sheet 4, ferritic stainless steel having main components of iron Fe, 20% chromium Cr, 5% aluminum Al is used. One flat sheet of a belt-like and foil-like form made of material mentioned above is prepared to be used as is as the flat sheet 4. The corrugated sheet 2 is obtained by corrugating such raw material of foil-like flat sheet using a corrugating machine or the like, and straight ridges and grooves of a predetermined form are formed by folding the sheet continuously.

Next, the brazing filler metal arranging process will be described below.

Nickel(Ni)-base brazing filler metal is used as the brazing filler metal 7. Its quantity is set to a rate within the range from 0.002 g to 0.07 g per 1 cc volume of the heat resisting structure 1. In the brazing filler metal arranging process, such brazing filler metal 7 is arranged at a predetermined places in the joint area between the corrugated sheet 2 and flat sheet 4.

In detail, nickel(Ni)-base brazing filler metal, the main component of which is nickel Ni, is used as the brazing filler metal 7. The composition of the brazing filler metal 7 is, by weight, 0.1% carbon C maximum, 7.0% to 8.0% silicon Si, 18.0 to 19.5% chromium Cr, 1.0 to 1.5% boron B, and the remainder is nickel Ni. It is known that the nickel(Ni)-base brazing filler metal has high high-temperature strength and excellent oxidation resistance. Such brazing filler metal (7) is arranged at the predetermined places in the joint area of the corrugated sheet 2 and flat sheet 4. That is, the brazing filler metal 7 does not braze the entire surface as is the case with the conventional practice, i.e., it does not cover the entire surface between the corrugated sheet 2 and flat sheet 4, but is arranged only at predetermined places in the joint area. For example, the brazing filler metal 7 is arranged via adhesive (not shown) applied in a variety of forms such as dots, short lines (see FIG. 6), etc. at a predetermined interval in its width direction on the outside of ridges and grooves of the corrugated sheet 2. Further, the brazing filler metal 7 may be arranged in parallel-line pattern at a predetermined interval along the longitudinal direction of the corrugated sheet 2 or the like (for example, brazing filler metal formed in a line-form with narrow width) disregarding the embodiments shown in the drawings. In this case, the advantage is that arranging the brazing filler metal is facilitated. The brazing filler metal 7 is provided at predetermined places in various locations, numbers, sizes, shapes, etc.

Figure 9:
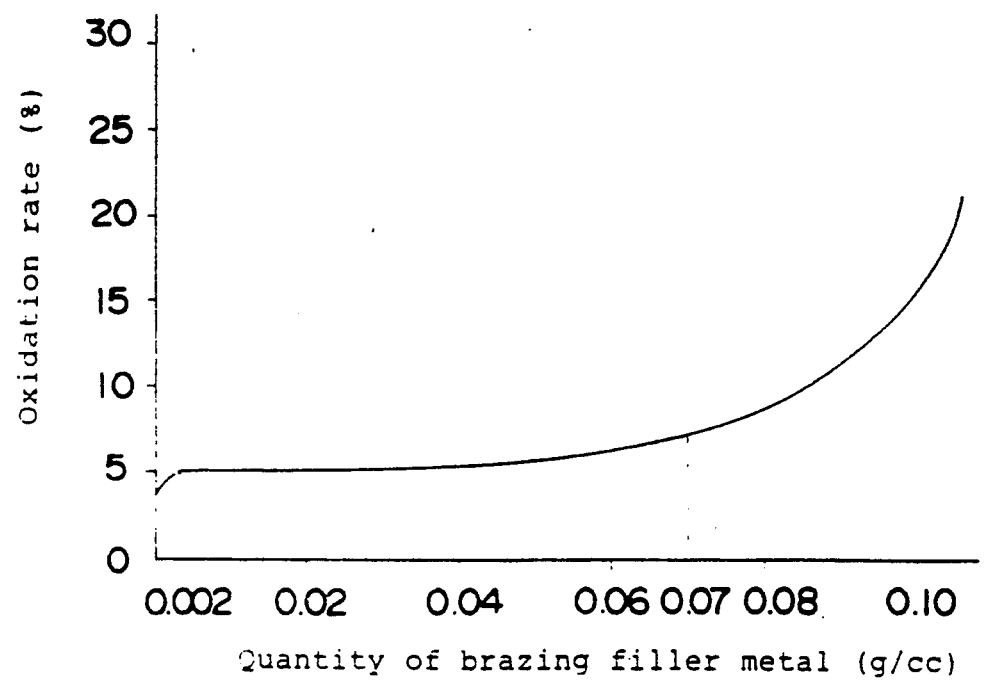
FIG. 9 is a graph showing the relation between the quantity of brazing filler metal and the oxidation rate.

Quantity of the brazing filler metal to be arranged in this manner is determined to be a suitable rate within the range from 0.002 g to 0.07 g per 1 cc volume of the finished heat resisting structure 1 (refer to FIG. 9 also). Nickel(Ni)-base amorphous brazing filler metal may be used as the brazing filler metal 7. Since the corrugated sheet 2 and flat sheet 4 are joined strongly in this case, the particular advantage of this heat resisting structure 1 is in the high strength.

Now, the forming process will be described.

In the forming process, the corrugated sheet 2 and flat sheet 4 are alternately rolled up to form a roll-form. In detail, in the forming process, alternate rolling up of the corrugated sheet 2 and flat sheet 4 is started at the predetermined center, and lapped into many layers. The forming process is performed before or after the brazing filler metal arranging process, or concurrently with this process. For example, after the corrugated sheet 2 and flat sheet 4 are rolled up in a roll-form, the brazing filler metal 7 may be arranged at the predetermined places in the joint area in the brazing filler metal arranging process. In this case, the brazing filler metal 7 is arranged at both ends of the corrugated sheet 2 and flat sheet 4 at the predetermined places. On the contrary, after the brazing filler metal 7 is arranged at the predetermined places in the joint area of the corrugated sheet 2 and flat sheet 4, these sheets may be rolled up in a roll-form in the forming process. (See FIG. 6.) Further, the brazing filler metal 7 formed in a line-form with narrow width may be arranged in parallel at a predetermined interval along the longitudinal direction of the corrugated sheet 2 and flat sheet 4. In other words, the forming process and brazing filler metal arranging process are performed concurrently and in parallel, and while rolling up the corrugated sheet 2 and flat sheet 4 in a roll-form, the brazing filler metal 7 may be arranged sequentially at the predetermined places in the joint area as an alternative method.

The joining process will now be described.

In the joining process, after the foregoing processes, the corrugated sheet 2 and flat sheet 4 are joined with the brazing filler metal 7 by heating. That is, the brazing filler metal 7 provided at the predetermined places in the joint area of the corrugated sheet 2 and flat sheet 4 in the brazing filler arranging process is melted by heating up and joining the sheets 2 and 4. As a result, the sheets 2 and 4 which have been rolled in a roll-form in the forming process form a honeycomb-form structure and the shape is fixed to a circular cylinder, elliptical cylinder, or other specified form.

Now, the heat resisting structure 1 of the present invention will be described.

Figure 8:
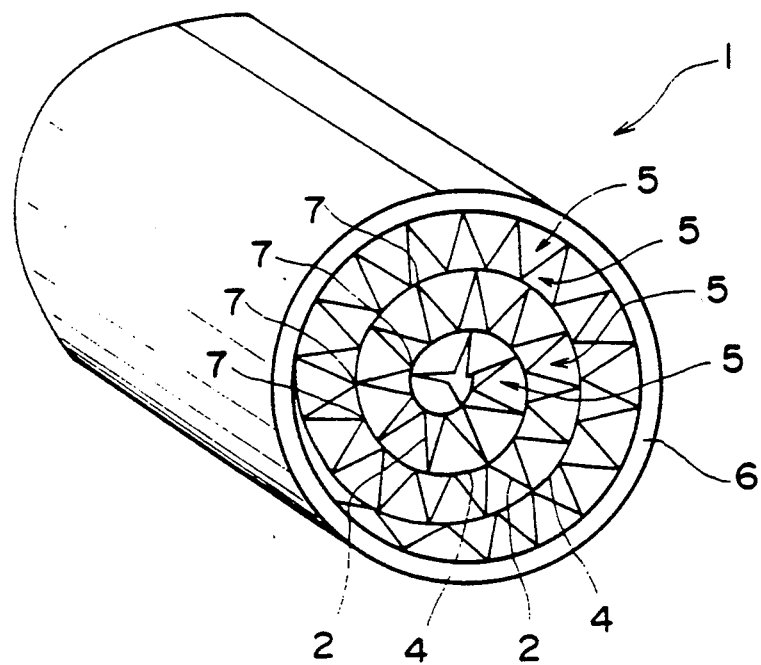

By executing the above-mentioned manufacturing method, i.e., through preparation process, brazing filler metal arranging process, forming process, and joining process, the heat resisting structure 1 shown in FIG. 8 is manufactured. The heat resisting structure 1 is a roll-form structure wherein the belt-like corrugated sheet 2 having alternating ridges and grooves formed by folding the sheet continuously and the belt-like flat sheet 4 are alternately rolled and joined via the brazing filler metal 7, thus a honeycomb-form structure is made. The corrugated sheet 2 and flat sheet 4 are made of ferritic stainless steel. The brazing filler metal 7 is nickel(Ni)-base brazing filler metal and provided at predetermined places in the joint area of the corrugated sheets 2 and flat sheet 4. The quantity of the brazing filler metal 7 is determined to be a rate within the range from 0.002 g to 0.07 g per 1 cc volume of the heat resisting structure 1.

Figure 7:
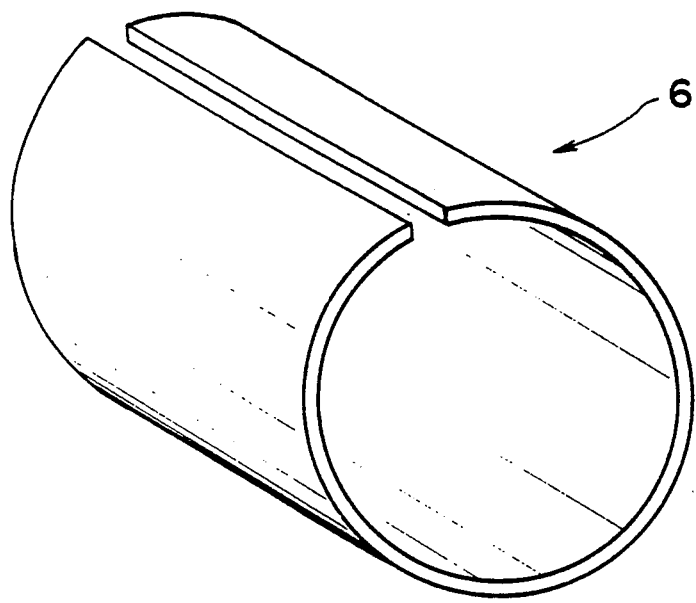

In this heat resisting structure 1, spaces of the corrugated sheet 2 are sectioned into independent vacant spaces by the flat sheet 4, and the sheets 2 and 4 form cell walls, and thus a honeycomb-form structure which is a plane assembly of hollow column-form cells 5 is formed. The heat resisting structure 1 of such honeycomb-form construction is known to have advantages such as high high-temperature strength, light weight, high rigidity and strength, good flow straightening effect, easy forming, low cost, etc. This heat resisting structure 1 is used, for example, for a catalytic converter to treat exhaust gas of an automobile engine as a catalyst holding body and the catalyst is adhered to the surfaces of the corrugated sheet 2 and flat sheet 4. FIGS. 7 and 8 shows a case 6 in which the heat resisting structure 1 is inserted and held.

The heat resisting structure 1 shown in FIGS. 4 through 8 is as follows.

First, in the heat resisting structure 1, brazing filler metal 7 of nickel(Ni)-base brazing metal is provided at specified places in the joint area of the ferritic stainless steel corrugated sheet 2 and flat sheet 4 which are made in honeycomb-form structure by being rolled up in a roll-form. The quantity of the brazing filler metal 7 is determined to be a rate within the range from 0.002 g to 0.07 g per 1 cc volume of this heat resisting structure 1. The manufacturing method of the heat resisting structure 1 is such that the brazing filler metal 7 of nickel(Ni)-base brazing filler metal is provided in the brazing filler metal arranging process with the quantity of a predetermined rate mentioned above at the predetermined places in the joint area of the ferritic stainless steel corrugated sheet 2 and flat sheet 4 prepared in the preparation process, and the corrugated sheet 2 and flat sheet 4 constituting the base metal are rolled in the forming process to form a roll-like form. The corrugated sheet 2 and flat sheet 4 constituting the base metal are joined with the brazing filler metal 7 by heating in the joining process, and as a result the heat resisting structure 1 of the honeycomb-form structure which is a plane assembly of hollow column-like cells 5 is manufactured.

Now, the advantages of this heat resisting structure 1 and its manufacturing method will be described in (1) through (5) below.

(1) The brazing filler metal 7 of nickel(Ni)-base brazing filler metal is arranged at predetermined places only, i.e., without covering the entire area but only a partial area, in a small quantity of a predetermined rate, i.e., in a minimum required quantity within the range from 0.002 g to 0.07 g per 1 cc volume of the heat resisting structure 1. Accordingly, when this heat resisting structure 1 is used at a high environmental temperature, chromium Cr segregation points in the vicinity of the joint boundary of the brazing filler metal 7 are reduced, and oxidation at the portion where chromium Cr concentration is low is reduced. In addition, an activating element of the brazing filler metal 7 diffuses in the vicinity of the joint boundary, changing the growing direction of the oxide film inward and reducing generation of stress. Accordingly, when stress is applied, stress corrosion cracking generation points on the austenitized brazing filler metal 7 are reduced, and also points where intergranular corrosion cracking, intergranular separation, etc. caused by precipitation of carbide at the grain boundary of the austenitized brazing filler metal 7 are reduced.

(2) Similarly, since the portions adversely affected by austenitization are limited to a small area, generation of cracks between the corrugated sheet 2 and flat sheet 4 constituting the base metal for joining and the austenitized brazing filler metal 7 caused by the great difference of coefficient of thermal expansion between them is reduced.

(3) Due to these facts, the oxidation rate of this heat resisting structure 1 is small and oxidation resistance is improved. FIG. 9 is a graphic representation of the relation between the quantity of the brazing filler metal 7 and the oxidation rate. As shown in FIG. 9, when the quantity of the brazing filler metal 7 is at the rate within the range from 0.002 g/cc to 0.07 g/cc as established by the present invention, the oxidation rate of the heat resisting structure 1 is reduced to, for example, as about 7% or less. In this heat resisting structure 1, the oxidation rate is very low, and accordingly oxidation resistance and durability have been improved.

(4) Since the quantity of nickel(Ni)-base brazing filler metal used as the brazing filler metal 4 is small, the heat resisting structure 1 becomes light in weight accordingly and the cost is reduced. In addition, since the corrugated sheet 2 and flat sheet 4 constituting the base metal are made of ferritic stainless steel, structure 1 is relatively low in material cost. Further, since such base metal barely generate stress corrosion cracking, intergranular corrosion cracking, etc., the heat resisting structure 1 has improved durability. Moreover, such advantageous heat resisting structure 1 can be manufactured with ease through the preparation process, brazing filler metal arranging process, forming process, and joining process.

Figure 10:
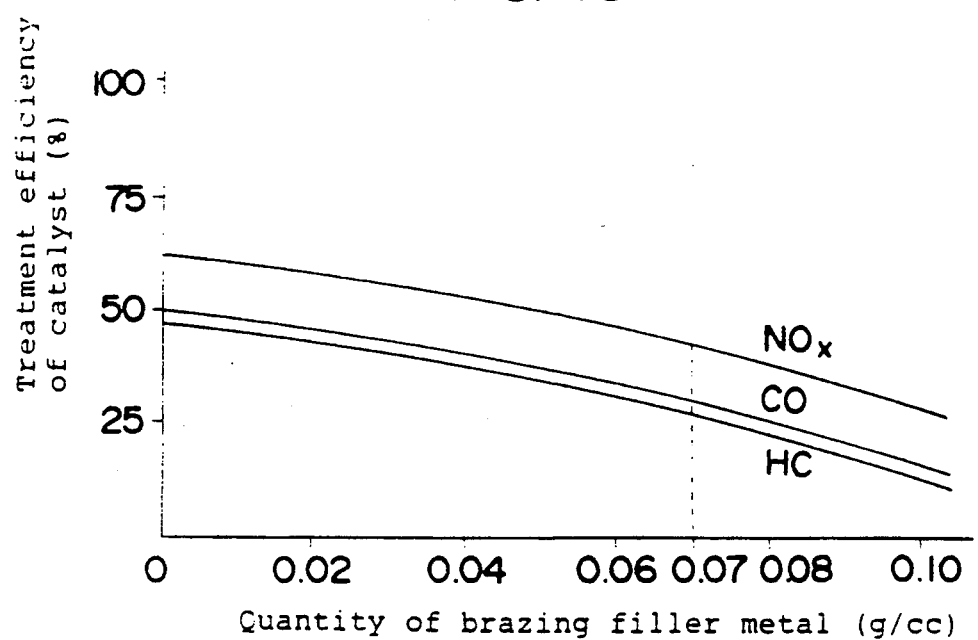
FIG. 10 is a graph showing relation between the quantity of brazing filler metal and the treatment rate of catalyst.

(5) An example of the application of this heat resisting structure will be described. Assume that this heat resisting structure 1 is used for a catalytic converter for treatment of exhaust gas of an automobile engine as a catalyst holding body and the catalyst is adhered to the surfaces of the corrugated sheet 2 and flat sheet 4. Even in such a case, since a small but specified amount, i.e. the minimum sufficient, of brazing filler metal 7 is arranged at predetermined places, adhesion of alumina washcoat applied between the corrugated sheet 2 and flat sheet 4 constituting the base metal and the catalyst is affected only in rare cases. Cases where the catalyst dissolves into the brazing filler metal 7 as solid solution are reduced, and accordingly reduction of catalyst density on the surfaces is prevented. As described above, when the heat resisting structure 1 is used as a catalyst holding body, the treatment efficiency of catalyst of the heat resisting structure 1 is improved and exhaust gas treatment efficiency is enhanced to a great extent. FIG. 10 is a graphic representation of the relation between the quantity of the brazing filler metal 7 and treatment efficiency of catalyst. As shown in this figure, when the quantity of the brazing filler metal 7 is of the value determined in this heat resisting structure 1, i.e. within the range of 0.07 g/cc or less, the treatment efficiency of catalyst with respect to harmful substances in the exhaust gas, for example, NOx, CO, HC, etc. is improved, for example, to at least about 30% or more.

Now, explanation will be made with reference to FIGS. 11 and 12.

The heat resisting structure 1 is formed in a honeycomb-like structure wherein the corrugated sheet 2 of stainless steel having alternating ridges and grooves formed by folding the sheet continuously and the stainless steel flat sheet 4 are joined alternately via the brazing filler metal 8 which is made of iron(Fe)-base brazing filler metal.

In detail, as raw material of the corrugated sheet 2 and flat sheet 4 constituting the base metal, ferritic stainless steel, austenitic stainless steel, and other various stainless steels having excellent corrosion resistance and heat resistance are used. Foil-like flat sheet of such stainless steel is used as is as the flat sheet 4. The corrugate sheet 2 is obtained by corrugating the foil-like flat raw material of stainless steel by means of a corrugating machine or the like, by which alternating straight ridges and grooves of predetermined shape is formed by folding the sheet continuously. The brazing filler metal 8 made of iron(Fe)-base group brazing filler metal contains iron Fe as the main component, and is known by its excellent corrosion resistance and heat resistance. The brazing filler metal 8 is used in a variety of forms such as powder, paste, amorphous, etc.

The roll-form (FIG. 11) or laminated block-form (FIG. 12) heat resisting structure 1 is formed using such stainless steel corrugated sheet 2, flat sheet 4, and the brazing filler metal 8 of iron(Fe)-base brazing filler metal. The roll-like heat resisting structure 1 shown in FIG. 11 comprises one belt-form stainless steel corrugated sheet 2 and one belt-form stainless steel flat sheet 4. The outline of the manufacturing method is such that first the brazing filler metal 8 of amorphous iron(Fe)-base brazing filler metal or the like is arranged, for example, over the entire surface between such corrugated sheet 2 and flat sheet 4, and then the corrugated sheet 2 and flat sheet 4 are rolled alternately starting at the predetermined center and lapped into many layers. Arranging the brazing filler metal 8 and rolling the corrugated sheet 2 and flat sheet 4 may be performed concurrently and in parallel. Thereafter, the brazing filler metal 8 is melted by heating to join the corrugated sheet 2 and the flat sheet 4 together, and thus a predetermined roll-form (circular cylinder, elliptical cylinder, etc.) heat resisting structure 1 is fabricated.

Figure 11:
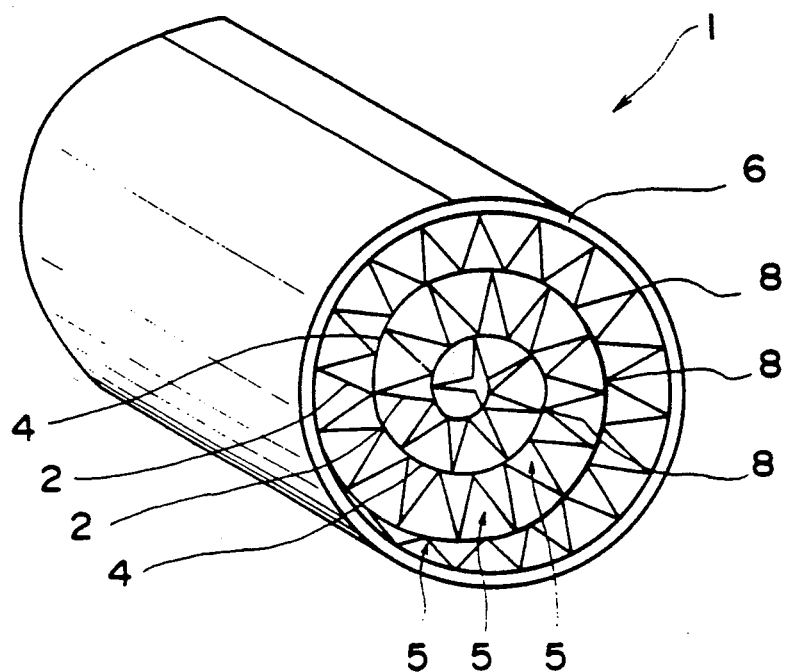
Figure 12:
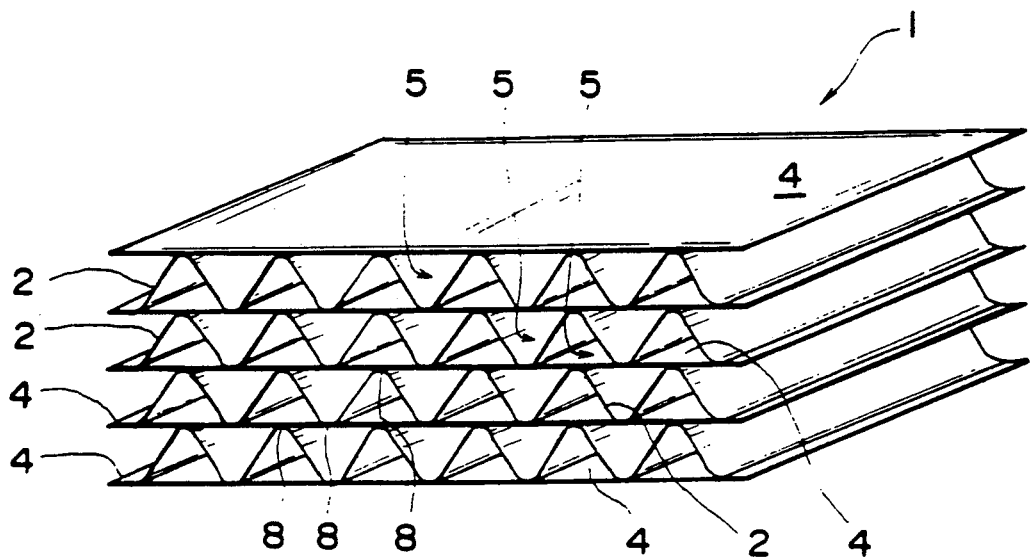

The laminated block-form heat resisting structure 1 shown in FIG. 12 is made of more than one stainless steel plate-form corrugated sheets 2 of predetermined length and more than one stainless steel plate-form flat sheets 4 of the same length. The outline of the manufacturing method is such that these corrugated sheet 2 and flat sheet 4 are alternately stacked vertically in sequence with the brazing filler metal 8 which is iron(Fe)-base brazing filler metal placed between them, for example, on the entire surface. Such placing and stacking may be performed one after another (not simultaneously and not in parallel). Thereafter, the brazing filler metal 8 is melted to join the corrugated sheet 2 and flat sheet 4 by pressing and heating at the top and bottom faces, and the laminated block-form heat resisting structure 1 of predetermined form is manufactured. The heat resisting structure according to the present invention is not limited to that of the roll-form (FIG. 11) or the laminated-form (FIG. 12) but those of other various forms are possible. Furthermore, the heat resisting structure can be formed by using only corrugated sheet 2 without using the flat sheet 4.

In this heat resisting structure 1, spaces of corrugated sheet 2 are sectioned into independent vacant spaces by the flat sheet 4, and the corrugated sheet 2 and flat sheet 4 form cell walls, thus a honeycomb-form structure which is a plane assembly of hollow column-like cells 5 is formed. Such heat resisting structure 1 of a honeycomb-form structure is known to have such advantages as a high high-temperature strength, light weight, high rigidity and strength, excellent flow straightening effect, easy-to-form feature, low cost, etc. Due to these advantages, such heat resisting structure 1 is, for example, used for a catalytic converter for treating exhaust gas of an automobile engine as a catalyst holding body, and catalyst such as platinum Pt, palladium Pd, rhodium Rh, or the like is made adhered to the surfaces of the corrugated sheet 2 and flat sheet 4.

The heat resisting structure 1 shown in FIGS. 11 and 12 is constructed as mentioned-above, the advantages are as follows.

In this heat resisting structure 1, the brazing filler metal 8 made of iron(Fe)-base brazing filler metal is used for joining the corrugated sheet 2 and flat sheet 4. Such heat resisting structure 1 is used at a high environmental temperature as, for example, a catalyst holding body. Its advantages are as described in (1) through (7) below.

(1) The brazing filler metal 8 made of iron(Fe)-base brazing filler metal, and the stainless steel corrugated sheet 2 and flat sheet 4 constituting the base metal are similar in composition—they are iron(Fe)-base material. Accordingly, even when this brazing filler metal 8 diffuses into the stainless steel corrugated sheet and flat sheet 4, the joint boundary of the corrugated sheet 2 and flat sheet 4 are not converted into a different composition. Therefore, stress corrosion cracking, intergranular corrosion cracking, intergranular separation, etc. are not likely to occur.

(2) The brazing filler metal 8 made of iron(Fe)-base brazing filler metal, and stainless steel corrugated sheet 2 and flat sheet 4 constituting the base metal are similar in composition. Accordingly, almost no difference exists in the coefficient of thermal expansion between the brazing filler metal and the base metal. As a result, cracks caused by thermal stress between them due to difference in coefficient of thermal expansion is avoided even when used repeatedly.

(3) The brazing filler metal 8 made of iron(Fe)-base brazing filler metal is easy to set, for example, it can be arranged over the entire surface as in conventional practice. That is, there is no restriction such as to limit the quantity of the brazing filler metal to be used or to arrange it partially, and the brazing filler metal 8 is, for example, easy to set. Accordingly, this heat resisting structure 1 can be manufactured with ease.

(4) The brazing filler metal 8 made of iron(Fe)-base brazing filler metal is inexpensive. The fact is a cost-related advantage of this heat resisting structure 1. The brazing filler metal 8 made of iron(Fe)-base brazing filler metal does not cause pitting corrosion on the stainless steel corrugated sheet 2 and flat sheet 4, though nickel(Ni)-base brazing filler metal does, therefore this heat resisting structure 1 has excellent durability.

(5) By diffusing the brazing filler metal made of iron(Fe)-base brazing filler metal sufficiently into the stainless steel corrugated sheet 2 and flat sheet 4 constituting the base metal for a sufficient period of time at the time of brazing, i.e., at the time of heating, its remelting point can be raised to the same level as that of the corrugated sheet 2 and flat sheet 4. That is, in the case where nickel(Ni)-base brazing filler metal is used, the heat-proof temperature of the heat resisting structure 1 depends on the remelting point of the brazing filler metal which is low, but in the case of iron(Fe)-base brazing filler metal, the heat-proof temperature of the heat resisting structure 1 is not lowered by the brazing filler metal.

(6) The brazing filler metal 8 made of iron(Fe)-base brazing filler metal produces a stable oxide film, or scale, on its surface after brazing. Consequently, this heat resisting structure 1 is protected from the progress of subsequent oxidation.

(7) Advantages of this heat resisting structure when, for example, used for a catalytic converter for treatment of exhaust gas of an automobile engine as a catalyst holding body and the catalyst is made adhered to the surfaces of the corrugated sheet 2 and flat sheet 4 are as follows. In this case, being different from nickel(Ni)-base brazing filler metal, the brazing filler metal 8 made of iron(Fe)-base brazing filler metal does not affect adhesion of alumina wash-coat to be applied as a primer between the corrugated sheet 2 and flat sheet 4 constituting the base metal and the catalyst. Furthermore, in no case the catalyst dissolves as solid solution into the brazing filler metal 8 composed of iron(Fe)-base brazing filler metal, and catalyst density on the surface does not decrease. Due to the above-mentioned features, when this heat resisting structure 1 is used as a catalyst holding body, the treatment efficiency of the catalyst is improved and the exhaust gas treatment efficiency is high.

As have been described so far, the heat resisting structure in accordance with the present invention is suitable for use at a high environmental temperature, and it is used for a variety of uses. For example, it may be used for a catalytic converter for treatment of exhaust gas of an automobile engine as a catalyst holding body, to which the catalyst is adhered.

What is claimed is:

1. A heat resisting structure used as a catalyst carrier in a catalytic converter for treating the exhaust gas of a gas engine comprising: a honeycomb-form structure, said honeycomb-form structure formed of at least one corrugated sheet having alternating ridges and grooves formed by folding the sheet continuously, and at least one flat sheet, said corrugated sheet and said flat sheet being alternately joined via an iron-based brazing filler metal, said corrugated sheet and said flat sheet comprising ferritic stainless steel and having a catalyst selected from the group consisting of platinum Pt, palladium Pd and rhodium Rh attached to the opposite surfaces of both said corrugated sheet and said flat sheet, said corrugated sheet and said flat sheet being alternately overlapped, rolled up, and joined to make a roll-form heat resisting structure.

2. The heat resisting structure as claimed in claim 1, wherein said iron-base brazing filler metal is arranged over substantially the entire surface of said flat sheet between said corrugated sheet and said flat sheet.

3. The heat resisting structure as claimed in claim 1, wherein said ferritic stainless steel comprises 20% chromium and 5% aluminum, the remainder being iron.

4. A heat resisting structure used as a catalyst carrier in a catalytic converter for treating the exhaust gas of a gas engine comprising: a honeycomb-form structure, said honeycomb-form structure formed of at least one corrugated sheet having alternating ridges and grooves formed by folding the sheet continuously, and at least one flat sheet, said corrugated sheet and said flat sheet comprising ferritic stainless steel and having a catalyst selected from the group consisting of platinum Pt, palladium Pd and rhodium Rh attached to the opposite surfaces of both said corrugated sheet and said flat sheet, said corrugated sheet and said flat sheet being alternately joined via an iron-based brazing filler metal, wherein said iron-based brazing filler metal is arranged over substantially the entire surface of said flat sheet between said corrugated sheet and said flat sheet, said corrugated sheet and said flat sheet being alternately overlapped, rolled up, and joined to make a roll-form heat resisting structure.

5. The heat resisting structure as claimed in claim 4, wherein said ferritic stainless steel comprises 20% chromium and 5% aluminum, the remainder being iron.

* * * * *